United States Patent [19]
Holborow

[11] Patent Number: 5,887,847
[45] Date of Patent: Mar. 30, 1999

[54] DIGITALLY CONTROLLABLE FLOW RATE VALVE

[75] Inventor: Peter A. Holborow, Califon, N.J.

[73] Assignee: Automatic Switch Company, Florham Park, N.J.

[21] Appl. No.: 932,655

[22] Filed: Sep. 18, 1997

[51] Int. Cl.⁶ .................................................. F16K 31/128
[52] U.S. Cl. ......................... 251/33; 251/30.02; 251/61.5
[58] Field of Search ................................. 251/331, 30.01, 251/30.02, 33, 37, 61.5, 61.2; 137/613

[56] References Cited

U.S. PATENT DOCUMENTS

| | | | |
|---|---|---|---|
| 2,323,839 | 7/1943 | Nixon | 251/33 X |
| 3,211,415 | 10/1965 | Rudelick | 251/33 |
| 4,816,083 | 3/1989 | Bangyan | 251/33 X |
| 5,042,775 | 8/1991 | Willemsen | 251/30.02 |
| 5,379,794 | 1/1995 | Brown | 137/613 X |

*Primary Examiner*—Kevin Lee
*Attorney, Agent, or Firm*—Levine & Mandelbaum

[57] ABSTRACT

A digitally controllable valve has a main valve member mounted on a diaphragm for movement sealing and exposing a main valve seat. A flow restriction on the main valve member varies the flow rate as a function of displacement of the main valve member from the main valve seat. Pressure in a reservoir above the diaphragm is controlled by two pilot valves respectively connected to the inlet and outlet ports of the main valve, one of which has fluid passageway with a larger minimum cross sectional area than the other. Both pilots communicate with the reservoir through a single common bleed opening which has an area less than the minimum cross sectional areas of pilot valve flow passageways.

1 Claim, 5 Drawing Sheets

DIGITALLY CONTROLLABLE FLOW RATE VALVE

BACKGROUND OF THE INVENTION

This invention relates to a valve for controlling the flow rate of a fluid in response to a digital electrical signal. Such valves are used for blending and mixing liquids, e.g., in the dispensing of gasoline.

A digitally controllable valve has a main diaphragm valve connected to two pilot solenoid valves. The pilot valves are independently opened and closed to control the volume in the chamber immediately over the main diaphragm or piston.

To obtain constant volume rate of primary flow, i.e., flow through the seat of the main valve, both pilot valves are closed via their respective solenoids and the outlet pilot valve connected to the outlet port of the main valve is pulsed open to gradually relieve the fluid pressure from behind the diaphragm. In response to the pulsing, the diaphragm moves up by a controlled distance depending upon the width of the pulse and the number of pulses applied, and fluid is allowed to escape from behind the main diaphragm. By this method, the diaphragm can be incrementally raised off of the main valve seat to allow controlled opening in digital stages. To close the main valve, the outlet pilot valve is closed and the inlet pilot valve is opened by pulsing its solenoid. This now restores fluid above the diaphragm to digitally lower the diaphragm in controlled increments.

In such digitally controllable valves, a main valve member mounted on a diaphragm is movable within an opening in a main valve seat communicating with a main valve outlet port to define a variable cross sectional passageway through which fluid can flow from the main valve inlet port to its outlet port. The cross sectional area of the passageway is controlled by raising and lowering the main valve member from a sealing position in engagement with the main valve seat.

When the main valve member is in engagement with the main valve seat, fluid flow from the inlet port to the outlet port through the main valve seat is prevented. As the main valve member is lifted off of the main valve seat, fluid from the inlet port flows through the passageway between the main valve member and seat. The greater the displacement of the main valve member from the main valve seat, the larger is the passageway, and hence the rate of flow.

It is also known in the prior art to connect each of the inlet and outlet ports of the main valve to a reservoir on a side of the diaphragm opposite the main valve seat, through respective inlet and outlet solenoid pilot valves to control the fluid pressure above the diaphragm. The pilot valves are controlled by electrical power supplies which produce voltage pulses of width and frequency selected to incrementally raise and lower the main valve member to achieve a desired flow rate versus time profile. In certain applications, e.g., in blending and mixing valves used in the gasoline dispensing industry, it is desirable to be able to increase and decrease flow rates symmetrically, that is, to have the flow rate of a one constituent of a mixture through one valve increase at the same rate that the flow rate of another constituent fluid passed through another valve decreases so that the net flow rate of the blended mixture remains constant.

Referring to FIG. 1 there is shown a prior art, digitally controllable valve 1 having a main valve 3, an inlet solenoid pilot valve 5, and an outlet pilot solenoid valve 7. Pressure above a diaphragm 9 is controlled through two bleed passageways 11, 13 respectively connected to an outlet port of the inlet pilot valve 5 and an inlet port of the outlet pilot valve 7. Fluid enters the region 8 above the diaphragm 9 from the inlet pilot valve 5 and exits that region 8 through the outlet pilot valve 7. During a "low flow" mode of operation, both the inlet and outlet valves 5, 7 are opened and the main valve 3 closes to shunt all fluid flow through the pilot valves 5, 7.

Closure of the main valve 3 in response to the opening of both pilot valves 5, 7 is achieved by making the minimum cross sectional area of fluid flow through the inlet valve greater than the minimum cross sectional area of fluid flow through the outlet valve. This can be accomplished by making the diameter of the the inlet valve seat opening greater than the diameter of the outlet valve seat opening.

The result is that fluid from the inlet pilot valve 5 enters the region 8 above the diaphragm 9 faster than it can exit causing an increase in pressure above the diaphragm 9 which urges the diaphragm 9 to engage and seal a main valve seat 15 thereby preventing fluid flow within the main valve 3.

The introduction of this incongruence between the inlet and outlet pilot valves 5, 7 prevents symmetrical operation of the digitally controllable valve 1 for increasing and decreasing flow rate. That is, if two identical digitally controllable valves used to blend two constituent fluids of a mixture are energized by the same signal, one in an increasing flow rate mode and the other in a decreasing flow rate mode, the magnitudes of the rates of increasing and decreasing flow of the respective constituents will be unequal and the net flow rate of the blend will vary.

In one of the two identical digitally controllable valves 1 which is dispensing the constituent fluid with an increasing flow rate, its inlet valve is closed to prevent entry of fluid into the region 8 above the diaphragm 9 and the outlet valve is opened to enable the fluid above the diaphragm 9 to exit through the outlet port thereby causing the main valve member to move away from the main valve seat to increase the rate of flow. A desired flow rate vs. time profile is achieved by energizing the solenoid coil of the outlet pilot valve 7 with a train of voltage pulses having a corresponding pulse width and frequency.

In the other of the two identical digitally controllable valves 1 which is dispensing its constituent fluid with a decreasing flow rate, its inlet valve is opened to permit entry of fluid into the region 8 above the diaphragm 9 and its outlet valve is closed to prevent the fluid above the diaphragm 9 from exiting through the outlet port thereby causing the valve member to move toward from the valve seat to decrease the rate of flow. It is desired to achieve a complementary profile with respect to the increasing flow rate of the other constituent, that is, to have the flow rate decrease in accordance with a profile identical to but 180 degrees out of phase with the flow rate vs. time profile of the increasing flow rate constituent fluid. Due to the incongruence in the flow path dimensions of the valves 5, 7, this cannot be achieved by pulsing the outlet pilot valve 7 of one digitally controllable valve 1 for increasing the flow rate of its constituent with the same signal used to pulse the inlet pilot valve 5 of the other digitally controllable valve 1 for decreasing the flow crate of the its constituent fluid.

Hence in prior art digitally controllable valves, the achievement of complementary increasing and decreasing flow rate profiles has required that the electrical signals used to increase flow rate be altered with respect to those used to decrease flow rate to compensate for the incongruence between the bleed passageways leading from above the diaphragm 9 to the inlet and outlet pilot valves 5, 7. Such compensation requires duplication of hardware and/or use of complex circuitry and is difficult to achieve.

SUMMARY OF THE INVENTION

The present invention overcomes the aforesaid problems associated with prior art digitally controllable valves by providing uniform opening and closing characteristics of the main diaphragm in a digitally controllable valve having a valve body including an inlet port, an outlet port, a reservoir, a main valve seat defining an entranceway to the outlet port, a main valve member including a flexible diaphragm having an outer portion operatively connected to the body between the inlet port and the reservoir and an inner portion on which the main valve member is mounted so that it extends into and is movable within the outlet port entranceway. The diaphragm has one side exposed to the inlet port and another side exposed to the reservoir. Inlet and outlet pilot valves can be selectively actuated. The inlet pilot valve has an inlet conduit connected to and in communication with the main valve inlet port. The outlet pilot valve has an outlet conduit connected to and in communication with the main valve outlet port. The inlet pilot valve has an outlet conduit connected to and in communication with the inlet conduit of the outlet pilot valve at an interface having an aperture in communication with the reservoir for enabling bidirectional fluid flow between the reservoir and the pilot valves. The smallest cross sectional area along the path of fluid flow through the inlet pilot valve is greater than the smallest cross sectional area of fluid flow through the outlet pilot valve. The smallest cross sectional area along the path of fluid flow through the outlet pilot valve means is no less than the cross sectional area of the bleed aperture.

It is therefore an object of the invention to provide a digitally controllable valve which can precisely control the rate of fluid flow between an inlet and outlet port.

Another object of the invention is to provide a digitally controllable valve which can selectively be controlled to incrementally increase or decrease the rate of fluid flow in accordance with a desired fluid flow rate versus time profile.

Still another object of the invention is to provide a digitally controllable valve operated by pilot inlet and outlet valves which can selectively be controlled by the same electronics to symmetrically increase and decrease the rate of fluid flow in accordance with a common fluid flow profile.

A further object of the invention is to provide a digitally controllable valve operated by pilot inlet and outlet valves which can selectively be controlled by the same electronics to symmetrically increase and decrease the rate of fluid flow in accordance with a common fluid flow profile, and which can also be operated in a low flow mode.

Still a further object of the invention is to provide a digitally controllable valve having a valve member mounted on a diaphragm and operated by pilot inlet and outlet valves in communication with a reservoir above the diaphragm through a common bleed opening.

Other and further objects of the invention will be apparent from the following drawings and description of a preferred embodiment of the invention in which like reference numerals are used to indicate like parts in the various views.

DESCRIPTION OF THE PREFERRED EMBODIMENT

Figure 1:
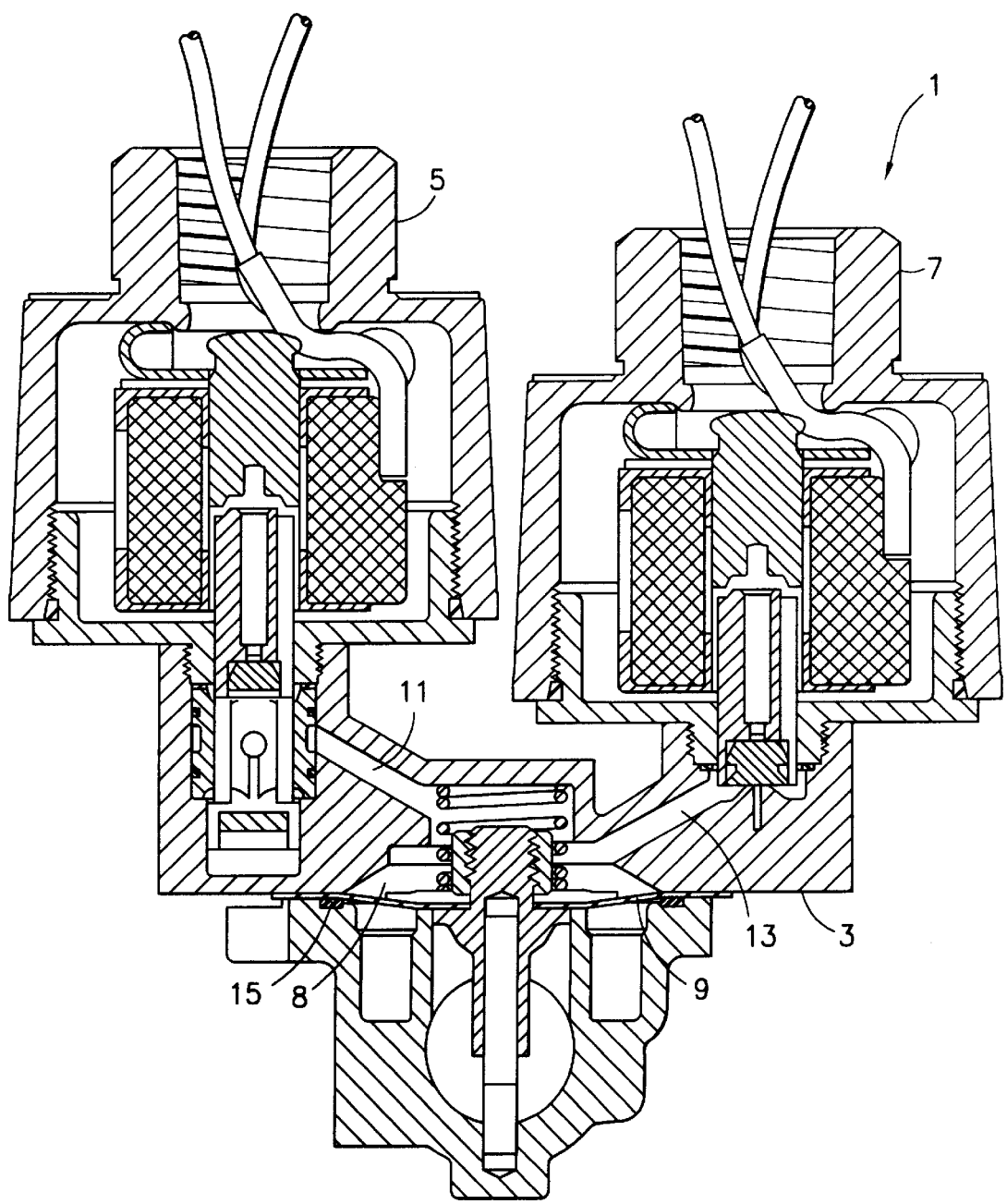
FIG. 1 is a sectional elevation view of a digitally controllable valve known in the prior art.

Referring now to FIGS. 2–5 of the drawings there is shown a digitally controllable valve 21 having a body 23, a normally open inlet pilot solenoid valve 51, a normally closed outlet solenoid pilot valve 71 and a main valve 29. The main valve 29 has an inlet port 31 and an outlet port 33. Within a passageway between the inlet port 31 and outlet port 33 is a valve seat 35 which can be selectively opened and sealed by a valve member 37 mounted on a flexible diaphragm 39 having an outer portion connected to the body 23 and an inner portion on which the member 37 is mounted. Extending from the valve member 37.are vanes 38, two of which can be seen in FIGS. 2–5, downwardly distending into and movable within an entranceway to the outlet port 33 which is surrounded by the valve seat 35. The diaphragm 39 has one side exposed to the inlet port and another forming the floor of a fluid reservoir 41. The valve member 37 is slidably mounted within a vertical section of outlet port 33 for reciprocal axial movement.

The valve seat 35 is sealed by the valve member 37 when the downward force exerted on the upper surface of the diaphragm 39 on which the valve member 37 is mounted exceeds the force exerted on the lower surface of the diaphragm 39, thereby preventing the flow of fluid across valve seat 35 into the outlet port 33. When the upward force exerted on the lower surface of the diaphragm 39 exceeds the downward force exerted on the upper surface of the diaphragm 39, the central portion of the diaphragm 39 is lifted thereby raising the valve member 37 off of the valve seat 35 and enabling fluid, to flow from the inlet port 31 to the outlet port 33 along a passageway between the vanes 38.

Axial movement of the valve member 37 takes place with the vanes 38 of valve member 37 guided within a vertical cylindrical wall of the outlet port 33 leading from the valve seat 35. When valve member 37 is out of engagement with valve seat 35, fluid flow can occur through the space between the vanes 38 of valve member 37. The exposed area of the openings between the vanes 38 increases as the valve member 37 rises with the central portion of the diaphragm 39 thereby correspondingly increasing the rate of flow from the inlet port 31 to the outlet port 33.

The downward force exerted on the upper surface of the diaphragm 39 is due primarily to the pressure exerted by fluid in the reservoir 41 above the diaphragm 39. The force of a spring 50 biases the valve member 37 toward the valve seat 35. The pressure in the reservoir 41 is controlled by an inlet pilot solenoid valve 51 and an outlet pilot solenoid valve 71.

The inlet pilot 51 has a core tube 57 about which there is wound a coil 55. A plug nut 59 mounted at one end of the core tube 57, where it serves as a pole piece, is magnetized while the inlet pilot coil 55 is energized to attract a plunger 53 slidably disposed within the core tube 57. The attractive force of the plug nut 59 causes the plunger 53 to move downwardly in the views of FIGS. 2–5, thereby causing a pilot valve member 61 affixed to the lower end of plunger 53 to engage a pilot valve seat 65 to prevent fluid flow through an orifice 60 surrounded by the seat 65. When the coil 55 is deenergized, e.g., between pulses, a return spring 66 urges the plunger 53 upward to its normally open position with the pilot valve member 61 displaced from the valve seat 65, thereby exposing the orifice 60 to allow fluid flow through it.

Extending from an opening in a wall defining the inlet port 31 is a conduit which serves as an inlet port 67 for the pilot 51 and which opens into a cavity above the valve seat 65 for communication with the orifice 60 when the pilot valve member 61 is lifted off of the pilot valve seat 65.

A conduit having one end connected to and integral with the underside of the inlet pilot solenoid valve seat 65 defines an outlet port 69 for the pilot 51. The opposite end of the conduit merges with a bridging conduit 88. Fluid flow from the inlet port 67 to the outlet port 69, through the orifice 60, is permitted when the plunger 53 is lifted to unseat the pilot valve member 61 from the seat 65 and prevented when the plunger 53 is lowered thereby urging the inlet pilot valve member 61 to engage valve seat 65 and seal the orifice 60.

The outlet pilot 71 is similar in construction and operation to the inlet pilot 51. That is, it has a core tube 77 about which there is wound a coil 75. A plug nut 73 mounted at one end of the core tube 77 is magnetized when the coil 75 is energized to attract an outlet solenoid pilot valve plunger 79 slidably disposed within the outlet solenoid pilot valve core tube 77. The attractive force causes the plunger 79 to move upwardly thereby lifting a pilot valve member 81 affixed to the lower end of the plunger 79 off of a valve seat 85 to allow fluid flow through an orifice 86 surrounded by the seat 85. When the coil 75 is deenergized, a spring 76 urges the plunger 79 downwardly to its normally closed position with pilot valve member 81 engaging the valve seat 85 and sealing the orifice 86 to prevent fluid flow through it.

Extending from an opening in a wall defining the outlet port 33 is a conduit which serves as an outlet port 89 for the pilot 71 and is in communication with the underside of the pilot valve seat 85.

A conduit defining a pilot inlet port 87 has one end 82 which opens into a chamber above the pilot seat 85 and an opposite end defining an inlet port 87 which merges with the bridging conduit 88.

Fluid flow from the inlet port 87 to the outlet port 89, through the orifice 86, is permitted when the pilot plunger 79 is lifted to raise the pilot valve member 81 from the pilot seat 85 and prevented when the plunger 79 is lowered thereby urging pilot valve member 81 to engage pilot seat 85 to seal the orifice 86.

A branch conduit running from an opening in a side wall of the bridging conduit 88 to the reservoir 41 above the diaphragm 39 provides a single common bleed hole 90 for fluid to enter and exit the reservoir 41 for controlling the pressure above the diaphragm 39. The bridging conduit 88 is divided by the bleed hole 90 into one section which is integral with the outlet port 69 of inlet pilot 51 and another section which is integral with the inlet port 87 of outlet pilot 71. Fluid enters and leaves the reservoir 41 only through the bleed hole 90.

Figure 2:
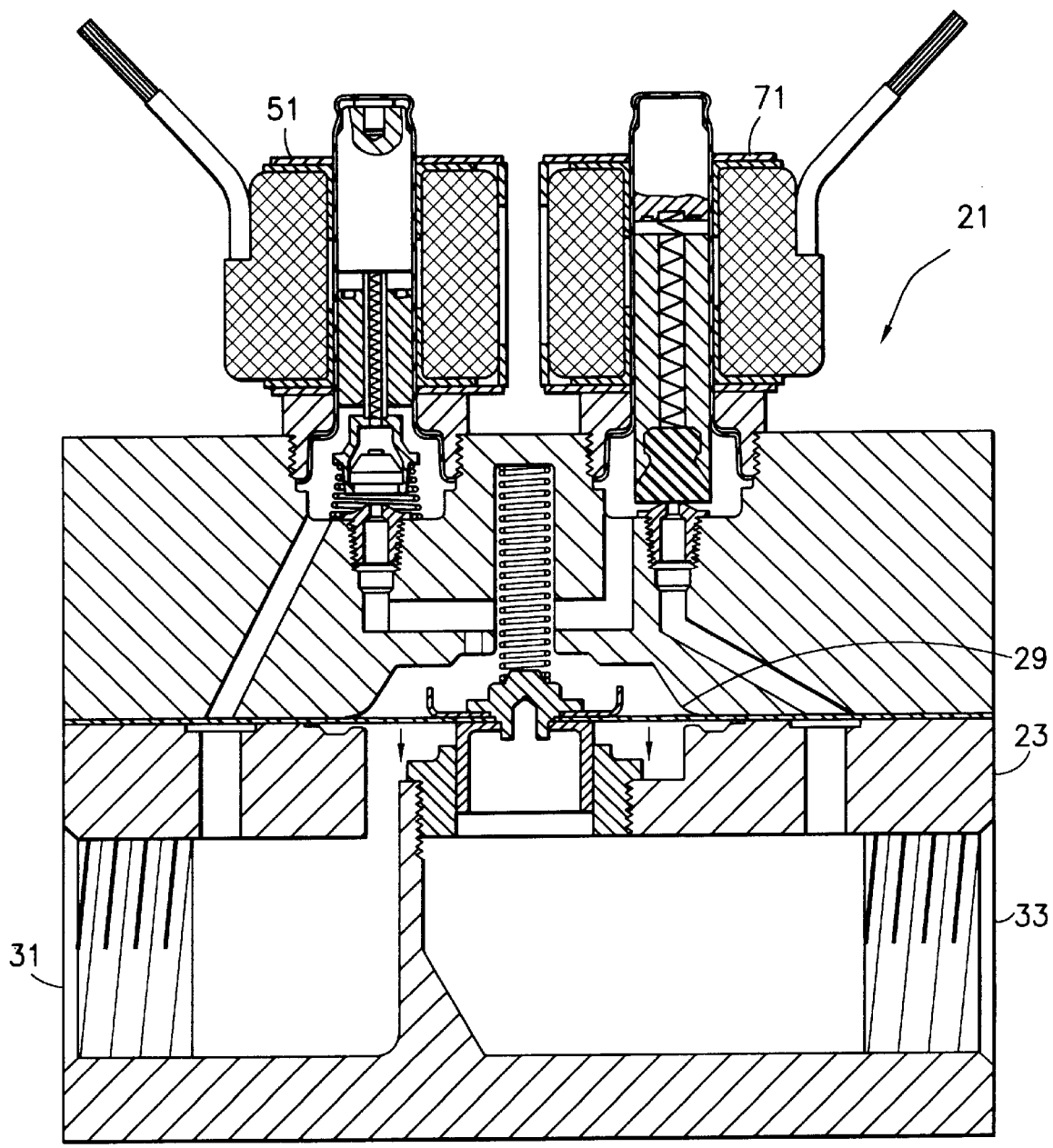
FIG. 2 is a sectional elevation view of a digitally controllable valve in accordance with the preferred embodiment of the invention in a first disposition.

Referring specifically to FIG. 2, when the inlet pilot 51 is open and the outlet pilot 71 is closed, the pressure in the reservoir 41 increases with respect to the pressure in the outlet port 33. As the pressure in the reservoir 41 exceeds the pressure in the outlet port 33 the diaphragm 39 and valve member 37 are urged downwardly thereby decreasing the rate of flow from the inlet port 31 through the valve seat 35, i.e., primary flow, to the outlet port 33. If the inlet pilot 51 is kept open for sufficient time to allow the valve member 37 to engage the valve seat 35, the rate of flow from the inlet port 31 to the outlet port 33 decreases to zero. The rate of decrease in flow can be controlled by electrically pulsing the inlet pilot solenoid valve coil 55 in accordance with a predetermined duty cycle, e.g., pulse width and frequency.

In the preferred embodiment of the invention, the inlet pilot valve 51 is normally open and the outlet pilot valve 71 is normally closed so that the main valve 29 will close in the event of a power failure. However, where other modes of operation may be desired in the event of a power failure, the inlet and outlet valves may be appropriately selected from the normally closed and open types as will be known to those skilled in the art.

Figure 3:
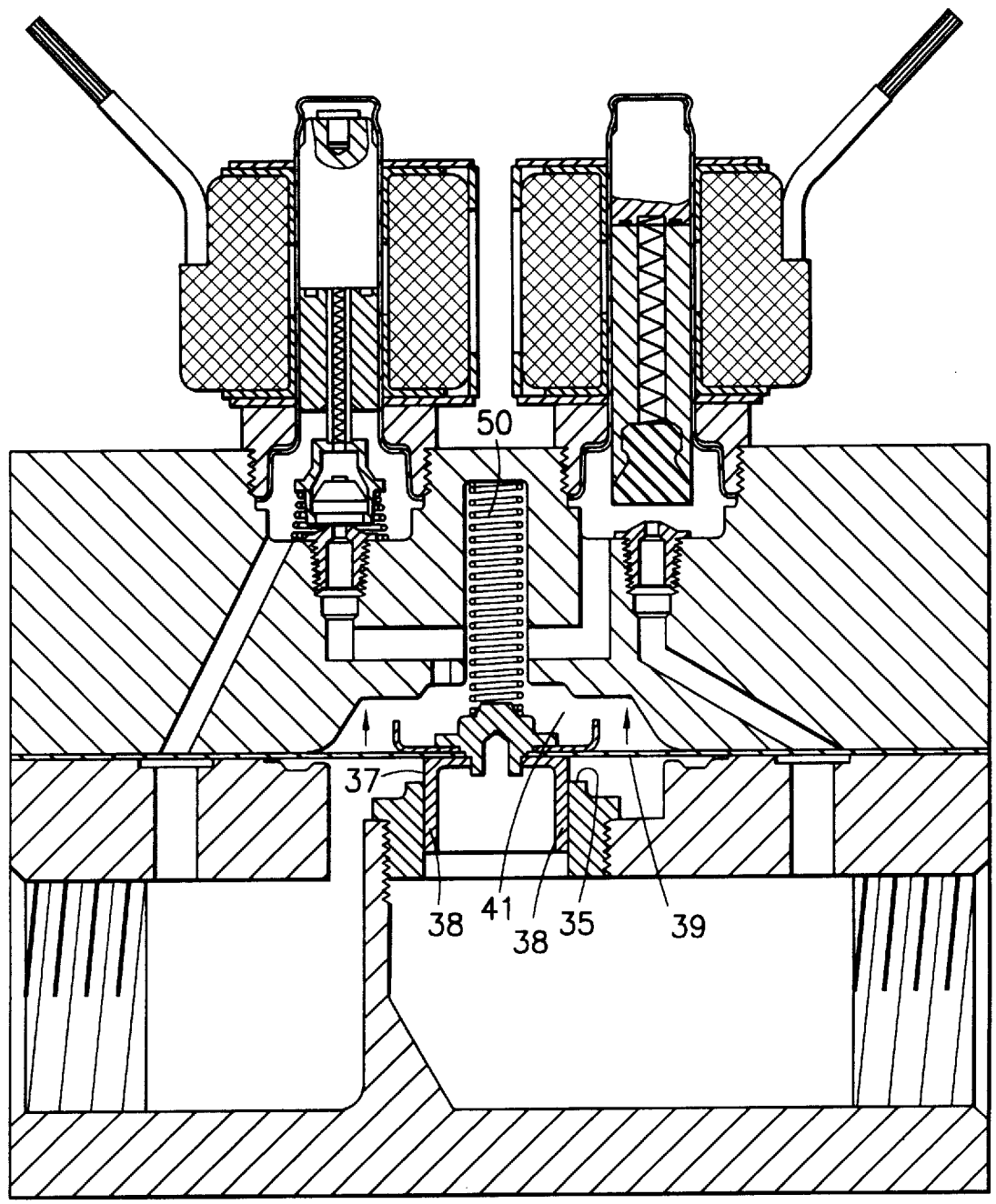
FIG. 3 is a sectional elevation view of a digitally controllable valve in accordance with the preferred embodiment of the invention in a second disposition.

As seen in FIG. 3, in order to increase the rate of primary flow, i.e., flow from the inlet port 31 to the outlet port 33 through the valve seat 35, the normally open inlet pilot solenoid valve coil 55 is energized thereby urging the inlet pilot solenoid valve plunger 53 downwardly to, close the inlet pilot 51, and the normally closed outlet solenoid pilot valve coil 75 is energized thereby causing the outlet solenoid pilot valve plunger 79 to lift the outlet solenoid pilot valve member 81 from the outlet solenoid pilot valve seat 85 thereby opening the outlet pilot 71.

With the inlet pilot 51 closed and outlet pilot 71 opened, the pressure in the reservoir 41 begins to drop toward the pressure in the outlet port 33 as fluid exits the reservoir 41 through the bleed hole 90 and bridging conduit 88 into the outlet port 33. As the pressure in the reservoir 41 decreases with respect to the pressure in the inlet port 31 and the pressure in the inlet port 31 begins to exceed the pressure in the reservoir 41, the net upward force on the diaphragm 39 lifts the valve member 37 away from the valve seat 35 causing the rate of primary fluid flow from the inlet port 31 to the outlet port, 33 through the valve seat 35 to increase. If desired, the rate of increase of primary flow can be controlled by electrically pulsing the outlet solenoid pilot valve coil 75 with a voltage having a pulse width and frequency chosen to provide the desired incremental increase in flow rate.

Figure 4:
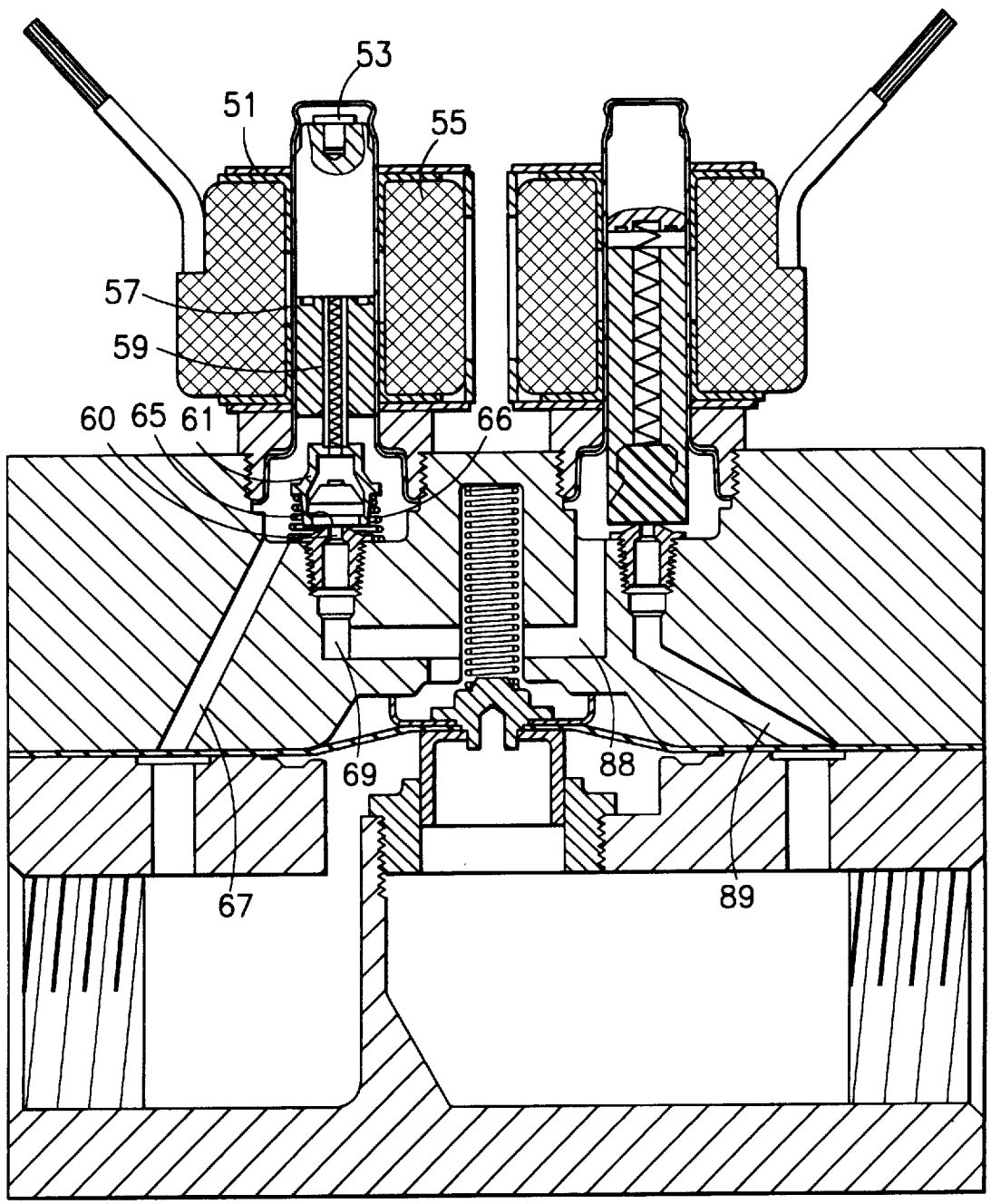
FIG. 4 is a sectional elevation view of a digitally controllable valve in accordance with the preferred embodiment of the invention in a third disposition.

Once the rate of flow has been increased or decreased to a desired steady state level of flow, both the inlet pilot 51 and outlet pilot 71 can be closed as shown in FIG. 4, to maintain that level of constant flow. With both the inlet pilot 51 and outlet pilot 71 closed, no fluid can enter into or exit from the reservoir 41 and the quantity of fluid in the reservoir 41 remains constant as does the downward pressure that it exerts on the diaphragm 39.

Figure 5:
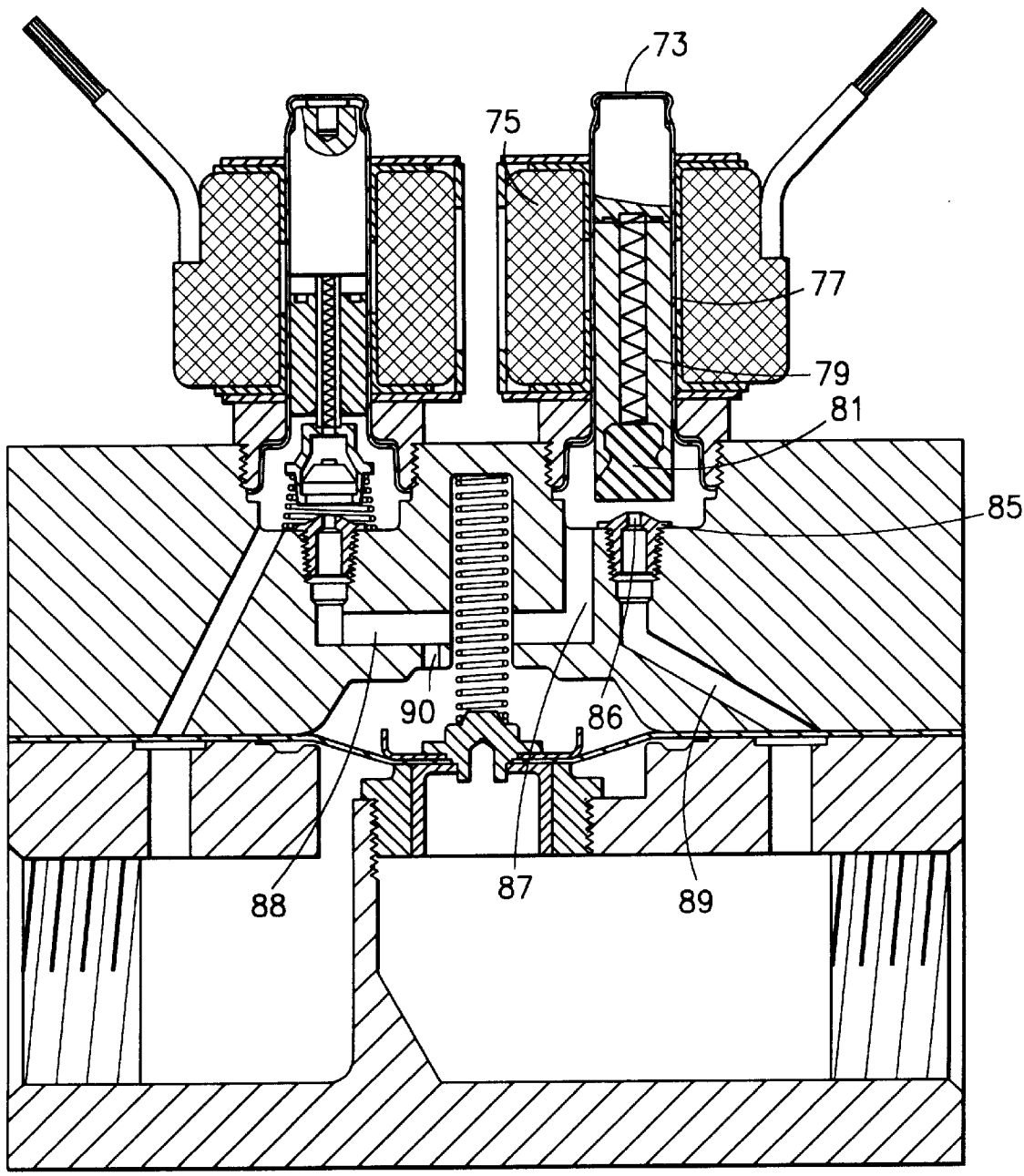
FIG. 5 is a sectional elevation view of a digitally controllable valve in accordance with the preferred embodiment of the invention in a fourth disposition.

The main valve 29 can also be operated in a "low flow" state illustrated in FIG. 5 by shunting the flow of fluid from the inlet port 31 to the outlet port 33 through the inlet pilot 51 and outlet pilot 71. Low flow operation is achieved by opening both the inlet pilot 51 and outlet pilot 71.

In order to ensure that the main valve member 37 is urged to close on the seat 35 when the valve 21 is operated in low flow mode, the inlet pilot valve seat orifice 60 has a larger diameter than the outlet pilot valve seat orifice 86. The effect of this difference in diameters is to make the minimum cross sectional area of fluid flow through the inlet pilot greater than the minimum cross sectional area of fluid flow through the outlet pilot. Hence fluid from the inlet pilot 51 enters the reservoir 41 through the bleed hole 90 faster than it can exit thereby causing an increase in pressure above the diaphragm 39 which urges the diaphragm 39 to engage and seal the main valve seat 35 thereby preventing fluid flow within the main valve 29. A main diaphragm valve spring 101 also provides a net downward force urging the valve member 37 against the valve seat 35 thereby assisting in the prevention of fluid flow through the valve 21 in the low flow mode.

In a digitally controllable valve 21 in accordance with the invention, the inlet pilot valve seat orifice 60 has a circular cross section with a diameter of 0.125 inches. The outlet pilot valve seat orifice 86 has a circular cross section with a diameter of 0.078 inches. The bleed hole 90 has a circular cross section with a diameter of 0.062 inches.

In the low flow mode shown in FIG. 5, fluid flows from the inlet port 31 to the outlet port 33 along a path from the inlet port 31 to the inlet pilot solenoid valve inlet port 67, across the open inlet pilot solenoid valve seat 65 into the inlet pilot solenoid valve outlet port 69, through the bridging conduit 88, into the outlet solenoid pilot valve inlet port 87, across the outlet solenoid pilot valve seat 85, through the outlet solenoid pilot valve outlet port 89 and into the outlet port 33. The volume rate of this secondary flow is substantially less than the maximum primary volume flow rate due to the restricted diameters of the inlet pilot solenoid valve inlet port 67, inlet pilot solenoid valve outlet port 69, bridging conduit 88, outlet solenoid pilot valve inlet port 87 and outlet solenoid pilot valve outlet port 89 in comparison with the much larger flow cross sections of the main valve ports 31, 33 and the opening in the seat 35.

Hence, by providing a single common bleed opening between the two pilot solenoids that communicate with the fluid reservoir above the main diaphragm, the main valve member 37 can be both raised and lowered to open and close the main valve 29 respectively, by approximately the same incremental distance per pulse. Morevoer, closure of the main valve 29 in low flow mode due to a pressure drop across the diaphragm can be assured.

It is to be appreciated that the foregoing is a description of a prefered embodiment of the invention to which variations and modifications may be made without departing from the spirit and scope of the invention.

What is claimed is:

1. A proportional flow valve comprising:

a valve body including an inlet port, an outlet port, a reservoir, and a main valve seat defining an entranceway to said outlet port, a main valve member comprising a flexible diaphragm having an outer portion operatively connected to said body between said inlet port and said reservoir and an inner portion on which there is mounted flow restriction means extending into and movable within said outlet port entranceway, said diaphragm having one side exposed to said inlet port and another side exposed to said reservoir, first and second pilot valve means each having an inlet conduit, an outlet conduit, and selectively actuable means for enabling and preventing fluid flow from its inlet conduit to its outlet conduit, said first pilot valve means inlet conduit being connected to and in communication with said inlet port, and said second pilot valve means outlet conduit being connected to and in communication with said outlet port, said first pilot valve means outlet conduit being connected to and in communication with said second pilot valve means inlet conduit at an interface having an aperture in communication with said reservoir for enabling bidirectional fluid flow between said reservoir and said conduits, wherein the smallest cross sectional area along the path of fluid flow through said first pilot valve means is greater than the smallest cross sectional area of fluid flow through said second pilot valve means.

* * * * *